June 21, 1960 L. E. OSBORNE 2,941,845
ANTI-SKID DEVICE
Filed Nov. 17, 1954 5 Sheets-Sheet 3

INVENTOR.
LYLE E. OSBORNE
BY John A. Young
ATTORNEY

United States Patent Office 2,941,845
Patented June 21, 1960

2,941,845

ANTI-SKID DEVICE

Lyle E. Osborne, South Bend, Ind., assignor to Bendix Aviation Corporation, South Bend, Ind., a corporation of Delaware Filed Nov. 17, 1954, Ser. No. 469,449

7 Claims. (Cl. 303—24)

This invention relates to a fluid pressure regulating mechanism and more particularly to an anti-skid device utilized in combination with a vehicle wheel and brake.

A fluid pressure control device has particular application in controlling brake-applying forces in aircraft usage where it is highly important to avoid skidding of the wheels. Skid condition is undesirable since the aircraft becomes uncontrollable and the tires are abraded at a single spot on the tire. Recurrent skid of the wheels may also produce pulsating forces on the landing gear which can be ruinous.

To eliminate skidding of the wheel, devices have been constructed which automatically reduce brake-applying fluid pressure when the device senses an impending skid; brake-applying pressure is then re-established when the wheel "recovers" or resumes non-slip speed, i.e., wheel rotary speed equal to ground speed of the aircraft.

A serious objection to anti-skid devices is that during cycling (periodically applying and automatically releasing the brake), a great amount of drag load on the vehicle is lost. This is best explained by reference to drawings which will hereinafter be described. It has been my experience that prior art devices operate on the principle that wheel skid is correctable only by uncontrolled release of the brake. Reapplication of the brake is then effected only after the wheel has resumed or nearly resumed non-slip speed. This results in pronounced fluctuation of retarding force on the vehicle and hence increases stopping distance of the vehicle. Obviously, it is desirable to obtain all the advantages of anti-skid devices without substantially reducing utilization of the brake. The present invention is designed to do this.

What the present invention accomplishes is greater utilization of the brakes while at the same time preventing skid of the aircraft wheel.

A complication which has been introduced by the method of this invention is called degenerative skid. (A degenerative skid may be defined as succeeding cycles of anti-skid operation which occur without the aircraft wheel regaining ground speed between cycles.) This problem of degenerative skid is absent in the prior devices because no brake-applying force was supplied at the wheels until the wheels fully or nearly fully resumed non-slip speed; while degenerative skid is no consideration in these prior devices, so also there is a sacrifice in available braking action.

My solution to degenerative skid is twofold. First, I propose to vary the time required to sense skid recovery according to the rate of acceleration of the wheel (low acceleration rates producing greater time intervals than higher acceleration rates). Second, I propose to control the rate of pressure build-up in the applying lines of the brake during skid recovery.

These preliminary statements of the invention will become more significant as the description develops. They will suffice however, to give some meaning to the following objects of the invention.

The principal object of this invention is to realize a maximum torque load on the aircraft wheel without causing skid thereof regardless of the coefficient of friction between the aircraft wheel and runway.

Another object of the invention is to provide an anti-skid device which is highly sensitive to wheel conditions so that response to skid is nearly instantaneous. In accomplishing this object it has been my aim to maintain as low as possible the required energy for controlling the brake applying pressure. A second and related objective of this invention is to reduce to a minimum the friction forces retarding response of the device to change in wheel conditions.

Another object of the invention is to impose braking force on the wheel during skid recovery of the wheel without producing degenerative skid as the wheel spins up to non-slip speed.

A further object of the invention is to sense skidding of the wheel and reduce brake-applying pressure in response thereto without completely releasing the brake if this is not necessary to prevent an impending skid. The purpose of this is to maintain a high average drag load on the vehicle and avoid excessive fluctuation of forces on the vehicle undercarriage.

Another object of the invention is to prevent brake lock during the initial landing period by utilizing a two-part inertia element. The result I wish to accomplish is to reduce the brake torque for a definite period of time during which time the wheel may spin up.

The above and other objects and features of my invention will appear more fully from the following description taken in connection with the accompanying drawings in which an embodiment of the invention is illustrated by way of example.

Figure 1:
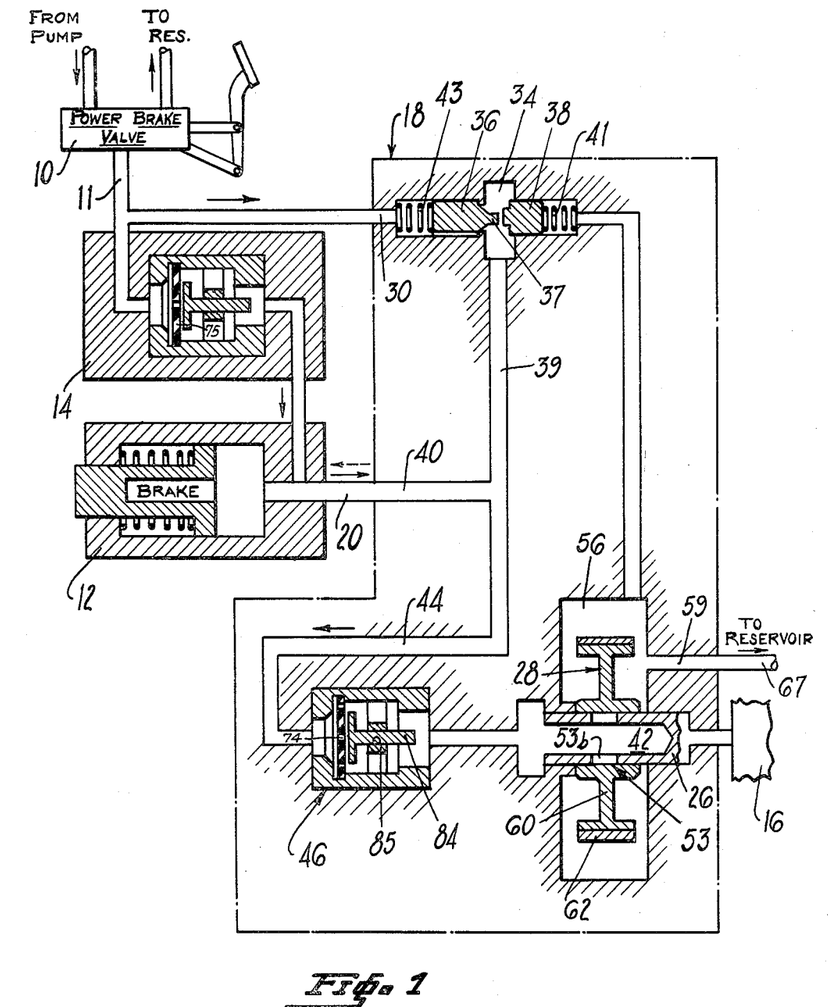
Figure 1 is a schematic drawing showing the anti-skid hydraulic system in conjunction with a power brake valve and a brake.

Referring to Figure 1, the schematic drawing shows generally the principal components of the brake system and how they are interconnected. Fluid under pressure from some appropriate source (not shown) is regulated into the system from a power brake valve 10 through line 11. The power brake valve 10 is connected to a pump (not shown) which forces fluid from a reservoir which replenishes the fluid supply for the system. The power brake valve is connected directly to brake 12 through an inlet valve indicated schematically in Figure 1 by numeral 14. The brake 12 is designed to control deceleration of aircraft wheel 16. Fluid pressure which is communicated to anti-skid device 18 through the line 11 from the power valve, may be relayed to brake 12 through the line 20. Hydraulic fluid flows from the anti-skid device to the brake through the line 20 (as indicated by the dotted arrow in Figure 1) when the brake is initially applied but thereafter fluid pressure cannot be transmitted to the brake via the anti-skid. The line 20 carries fluid in a reverse direction (indicated by solid arrow) in order to be bled from the brake through the anti-skid and to the reservoir. Line 20 can bleed pressure from the brake 12 through the anti-skid 18 to the reservoir, notwithstanding inlet flow from the power brake valve through the inlet valve 14 because the capacity of outlet valve 46 is greater than that of inlet valve 14. Application of the brake is controlled by fluid pressure in line 20. During anti-skid operation the brake is released by reducing fluid pressure in line 20 through the anti-skid 18 to the reservoir. The pilot may also release the brakes by relieving the applying effort exerted on the pedal.

Turning now to Figures 2 through 6, a more detailed consideration of the construction of the anti-skid device will be undertaken.

Figures 2, 11:
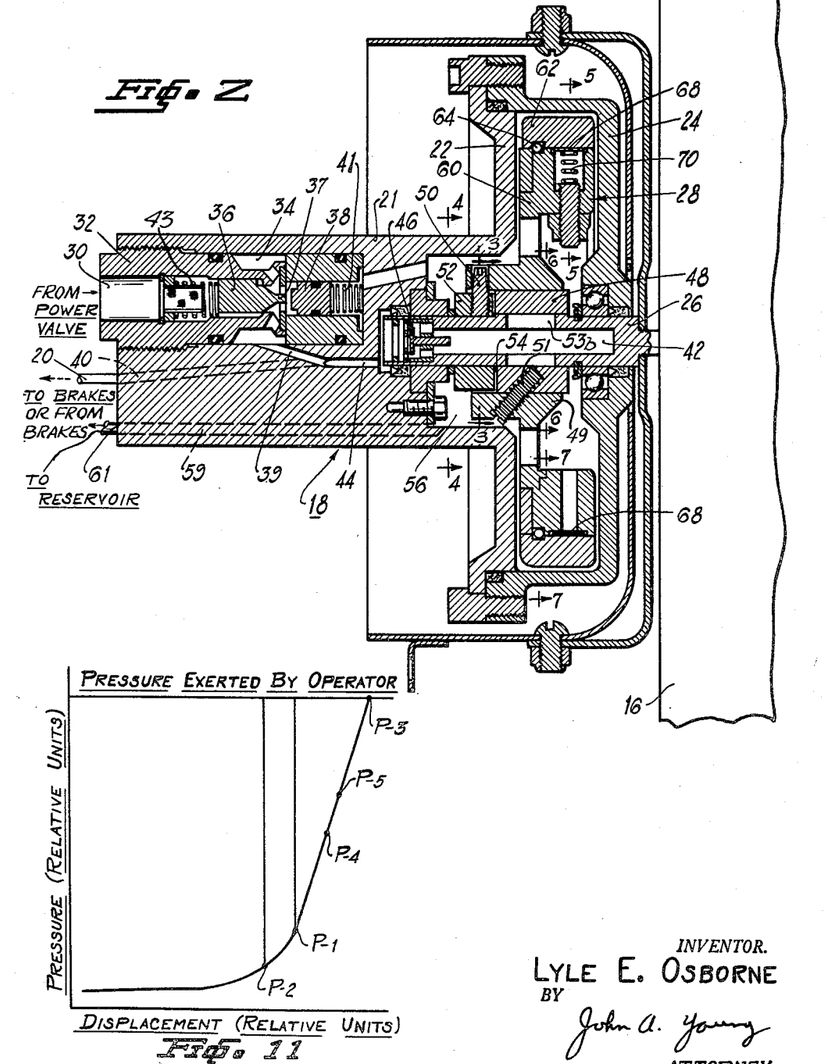
Figure 2 is a sectional view of the anti-skid device.
Figure 11 is a pressure v. displacement curve for a disk brake which is typical of the kind of brake used with the present invention.

The anti-skid device 18 consists of a fixed portion including a cylinder 21 and a flange 22 to which is secured a housing 24, and a rotatable portion including a shaft 26 fastened to the aircraft wheel 16 and a rotary inertia element 28.

The anti-skid device is connected with the power valve through an inlet port 30 formed in an insert 32 which is threadedly received in the anti-skid device. A chamber 34 is formed in the anti-skid device at the right-hand end of the insert. Access to this chamber 34 is controlled by a fill valve 36. A pressure responsive piston 38 is engageable with a stem 37 of the valve 36 to unseat the valve from a closed position and permit fluid flow into the chamber 34. Passage 39 leads from chamber 34, to port 40 where the anti-skid device is connected to line 20 leading to the brakes.

The fill valve 36 is held in an unseated condition by the forces exerted by spring 41 against piston 38 so that when the brake is first applied, fluid from the power valve can be pumped through the anti-skid device 18 to the line 20 leading to the brakes (see dotted arrow in Figure 2). Spring 41 is preloaded to exert a force greater than the force exerted by spring 43 which abuts fill valve 36. Once the brakes are applied, the fill valve 36 closes and remains closed so that thereafter fluid pressure from the power valve does not pass through the anti-skid device 18 to the brakes. Fill valve 36 closes shortly after a brake application because after the brake is applied the differential between the brake pressure and reservoir pressure causes piston 38 to move away from fill valve 36 thereby permitting spring 43 to seat fill valve 36 on its associated valve seat. Power valve pressure is accessible to the brakes only via valve 14 (see Figure 1) once the fill valve 36 is closed.

A second chamber 42 is formed in the anti-skid device by centrally boring the shaft 26. Chamber 42 is connected with passage 39 and passage 44. Hydraulic fluid can flow from the brakes to the chamber 42, the flow being regulated by an outlet valve 46. Fluid flow from the brakes to the chamber 42 relieves brake applying pressure.

Figure 3:
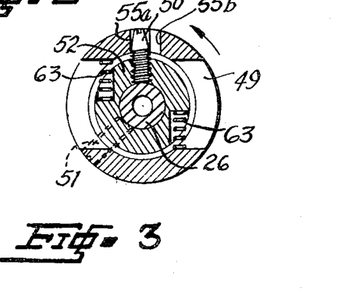
Figures 3, 4, 5, 6 and 7 are sectional views taken on lines 3—3, 4—4, 5—5, 6—6 and 7—7, respectively of Figure 2.
Figure 4:
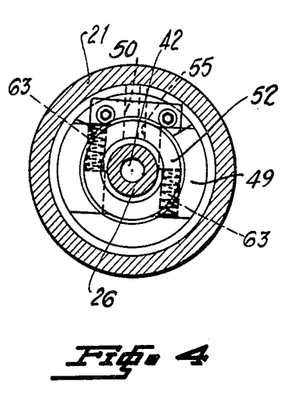

Rotary inertia element 28 is mounted on the shaft 26 through a sleeve 48. The hub 49 of the inertia element (Figure 3) is fastened to the sleeve 48 by means of screws 51. The inertia element is driven by a pin 50 positioned in a bushing 52 which in turn is secured to the shaft 26. Referring to Figure 3, the pin 50 is engageable with angularly spaced stops 55a and 55b on the hub 49 of rotary inertia element 28. Limited angular movement of the sleeve 48 and hub 49 of the rotary element 28 is permitted relatively to the shaft 26 (see Figures 2, 3 and 6) between the stops 55a and 55b which are engageable with the pin 50. Registrable channels 53a and 53b, constituting a rotary valve, are formed in the bushing 48 and shaft 26. The rotary valve is operable by the limited angular movement of the rotary element.

The bushing 48 is further provided with a passage 54 leading to chamber 56. The chamber 56 is connected to the hydraulic reservoir through a passage 59 terminating in opening 61. Line 67 is connected to opening 61 and leads to the hydraulic reservoir.

Figure 5:
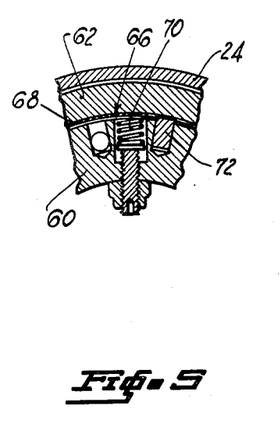
Figure 6:
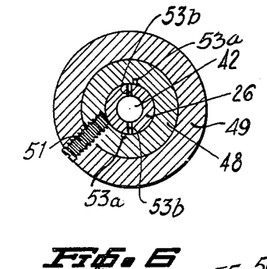
Figure 7:
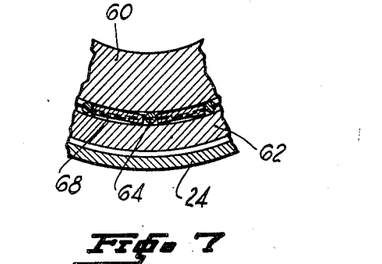

Referring to Figures 2, 5 and 7, the rotary inertia element 28 consists of a fly wheel 60, and an annular rim 62 mounted on a plurality of circumferentially spaced ball bearings 64 permitting circular movement of the rim on the flywheel. A friction clutch 66 is located between the flywheel and rim to resist circular movement of the rim of the flywheel with a force depending upon the direction of the relative circular movement therebetween. The friction clutch 66 comprises a band 68 encircling the perimeter of the flywheel, a resilient member 70 urging the band against the inner periphery of the rim, and a stud 72 positioned in the flywheel 60 which provides reaction for the band as it wraps against the inner periphery of the rim 62.

A pair of torque springs 63 (Figures 3 and 4), bearing at one end on the hub 49 of the flywheel 60 and at the other end on a milled portion of bushing 52, urge angular movement of the flywheel in a direction which interrupts registry of the channels 53a and 53b, thus keeping the rotary valve in a normally closed position and preventing communication of chambers 42 and 56. Hydraulic pressure applying the brakes is relieved by opening the rotary valve 53 against the springs 63 and bleeding pressure from line 20 into chamber 42 and then into chamber 56 which leads to the reservoir.

Figure 10:
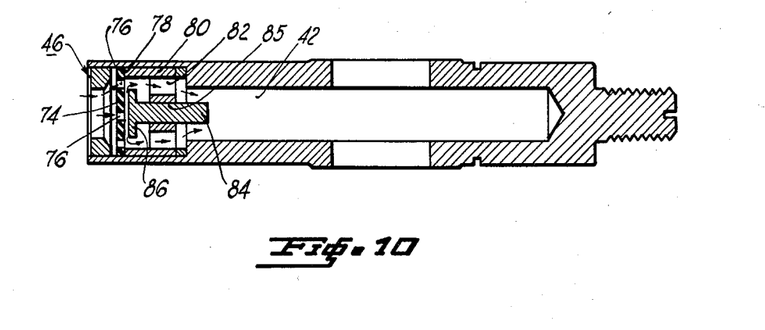
Figure 10 illustrates in enlarged view the valve controlling inlet-outlet orifice from the brake.

The valve 46, controlling the rate of fluid flow from the brakes to chamber 42, meters fluid (within certain ranges) at a rate inversely proportional to pressure drop inducing that flow. The construction of this valve is best seen in Figure 10. The valve 46 includes a resilient member 74 having a plurality of apertures 76. The resilient member is positioned against shoulder 78 of an annular bushing 80 which is retained in the chamber 42. The bushing 80 is provided with through passages 82 which permit fluid flow in the direction and path indicated by arrows in Figure 10. A stem 84 is suspended in the mid portion of chamber 42; the stem is received through a centrally disposed opening 85 in the bushing 80 and is fixed to bushing 80 for non-relative movement with respect thereto. Stem 84 has a transverse head 86 which is engageable with the central portion of the resilient member 74 when it is deformed thereagainst by fluid pressure of a predetermined value. Engagement of the central portion of the resilient member with head 86 restricts the apertures in this portion and reduces available area through which fluid is permitted to flow. It will readily be seen that by controlling the displacement of the resilient seal 74 responsive to fluid pressure I can regulate the rate of fluid flow in such a manner that the rate of fluid flow (within limits) is inversely proportional to the pressure differential across valve 46 for given pressure ranges.

Figure 9:
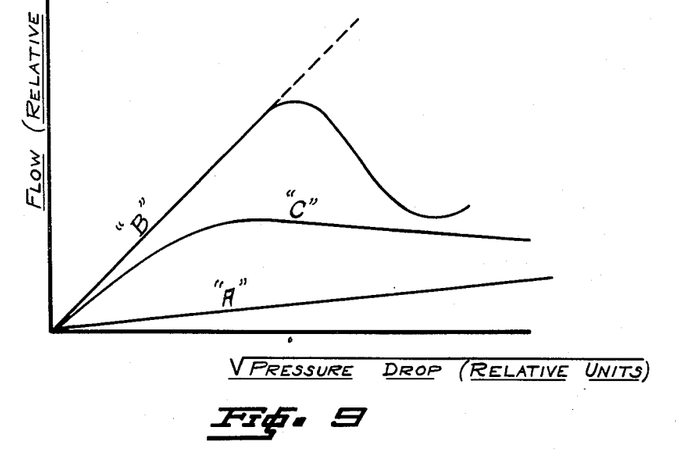
Fig. 9 is a flow v. pressure drop curve illustrating characteristics of valve means to be incorporated with this invention.

The flow characteristics of the outlet valve are shown in Figure 9. The flow characteristic of a conventional fixed orifice valve is labeled curve "A." It will be noted that the curve is a straight line, i.e., flow is directly proportioned to the square root of the pressure drop. This is not the case however with the outlet valve 46. Within limits the fluid flow is inversely proportioned to the pressure differential across the valve, and the significance of this will become apparent from a consideration of the operation of the device. The flow characteristics of this valve are illustrated by curve "B" in Figure 9.

The inlet valve 14 closely resembles the outlet valve in construction and operation. The difference as can be seen in Figure 1 is that only a centrally located aperture is provided in the resilient member 75 of inlet valve 14. The flow characteristic of the inlet valve is labeled curve "C" in Figure 9. The inlet valve curve "C" differs from outlet valve curve "B" because the valves have different flow capacities since the inlet valve has fewer apertures than the outlet valve. The flow characteristic of the inlet valve 14 forms an important part of the invention as will be apparent from the operation of the device inasmuch as the flow capacity of the inlet valve should be less than that of the outlet valve.

The operation of the anti-skid device will next be considered. As the aircraft approaches for a landing the strut is extended, and the brakes are off. If it is desired, a mechanism can be provided to keep the brakes off even though the brake pedals are applied during this time. When the wheel 16 touches down on the runway the wheel is caused to spin up by contact with the ground. Assume next that the airplane lifts slightly so that the wheel is disengaged from the ground. It is desirable at this stage to have the brakes in released position so that applying force on the pedals will not cause brake lock-up upon re-engagement of the wheels with the runway. This is accomplished as follows:

Initial touch down of the wheel causes it to spin up and thus produces rotation of shaft 26 which is fastened thereto. Rotation of the shaft causes synchronous rotary movement of the entire inertia element 28 which is driven with the shaft by engagement of the pin 50 with one of the stops on the inertia element. The rim 62 of the inertia element is accelerated to the speed of the flywheel 60 because of the clutch connection between the rim and flywheel. Assuming that the brakes are applied, the shaft 26 (which is fixed to the wheel) stops rotating and the inertia element moves angularly on the shaft 26 against the resistance of springs 63 to open the rotary valve 53. The flywheel 60 is limited in its angular movement by engagement of pin 50 with stop 55a or 55b. At this point the rim 62 overrides the flywheel and exerts a force on the flywheel through the clutch 66. Spinning of the rim on the flywheel tends to keep the flywheel in this angular position against the resistance of the torque springs 63, thus keeping the rotary valve 53 open and preventing build-up of brake-applying pressure in line 20.

Assume next that the aircraft settles on the runway. It will be understood that the following sequences are cyclic, that is, they are recurrent (if the brake produces a skid) until the aircraft is brought to a standstill. Description of one cycle should be sufficient for an understanding of events which occur during the stop.

The wheel engages the ground and is caused to spin up, thus rotating the shaft 26 which drives the flywheel in synchronous rotary movement through the pin 50. The rim is accelerated to the same speed as the flywheel almost immediately by the friction clutch connection between the flywheel and rim. It is pointed out at this time that the friction clutch is so constructed that the rim can override the flywheel but does not ordinarily underride the flywheel. In other words, the rotary speed of the rim may be greater than, but is not ordinarily less than, the rotary speed of the flywheel. The reason is that the clutch exerts greater torque in one direction than the other such that this characteristic is obtained. The rotary valve 53 is closed because of the angular position of the flywheel with respect to the shaft to permit pressure build-up in applying line 20.

When the brake is first applied, the fill valve 36 is held open by piston 38 as a result of the forces exerted by spring 41. Brake fluid from the power valve is passed through chamber 34 to passage 39 and line 20 where it is transmitted to the brakes. After a predetermined pressure build-up, the differential pressure between the brake and reservoir causes piston 38 to move against spring 41 and away from the valve 36. As a result of the forces exerted by spring 43 valve 36 closes and remains closed. Any further fluid access to the brake must come via the inlet orifice 14. The reason for this arrangement is that appreciable fluid displacement is initially needed to create pressure build-up in the lines. Time delays to achieve this build-up are very undesirable at this stage of the landing and hydraulic fluid in quantity must be transferred through the fill valve in a relatively short interval. Considerable displacement of the brake parts is necessary before line pressure begins to build up. Since line pressure is a measure of brake applying force, it will be apparent that no appreciable applying force is obtained until clearances are taken up in the brake. The fill valve serves to transmit hydraulic fluid in quantity when the brake is first applied so that clearances in the brake may be taken up quickly.

After the brakes are applied, the wheel begins to decelerate. If the wheel then starts to slide on the runway, this will be sensed by relative movement of the flywheel 60 on the shaft 26, the flywheel moving angularly on the shaft 26 until the pin 50 engages the second spaced stop 55b. This angular movement of the flywheel relative to the shaft opens the rotary valve 53. The two chambers 42 and 56 are connected upon opening of the valve 53 against the resistance of springs 63, and brake applying pressure in line 20 is relieved to diminish applying force on the brakes.

If the wheel is completely stopped or is rotating at a lower speed than the flywheel, the flywheel moves angularly on the shaft until it engages the second stop whereupon the rim overrides the flywheel and maintains the flywheel in this angular position in which the rotary valve 53 is opened. The inertia of the overriding rim 62 develops sufficient force on the flywheel through the clutch to keep the valve 53 open against the force of the torque springs 63.

Following the diagram in Figure 8 it will be seen that wheel r.p.m. reduces below non-slip speed and a skid is then sensed, at which time brake applying pressure diminishes responsive to anti-skid operation. The wheel r.p.m. continues to drop however because of lag in reduction of pressure, inertia, reduced coefficient of friction during skid, etc.

It is one of the important characteristics of the present invention that pressure is reduced at such a rate that there is minimum undershooting of pressure required for skid recovery. That is, the rate of pressure reduction is not so excessive that the pressure reaches a value below that necessary to enable wheel spin up. This is an important factor in the performance of the anti-skid device because the added time necessary to build up the pressure again to its maximum value represents a loss in available braking torque and hence retarding effort on the aircraft when the wheel resumes non-slip speed. The primary purpose of controlling the rate of pressure fall-off during skid is to avoid excessively low pressures at the start of and during skid recovery and in this way reduce the time interval for re-establishing maximum brake pressure. The fact that I do maintain a higher pressure in the lines during skid does not contribute to retarding force on the aircraft; while the wheel is sliding brake torque does not contribute to retarding force on the aircraft.

It is well to consider here the function of the valve 46. When a skid is sensed and the chambers 42 and 56 are connected, the valve permits rapid reduction of brake applying pressure since it has a greater flow capacity than inlet valve 14, but not at a rate wherein pressure excessively undershoots that necessary to enable skid recovery; this has the effect of flattening the negative slope of the pressure-time curve (see Figure 8).

After the brake pressure has diminished sufficiently, the wheel begins to accelerate. The wheel now undergoes what is called skid recovery, i.e., it continues to spin up until it resumes angular velocity equal to ground speed, the non-slip speed. It is during skid recovery that the principal advantages of the invention are realized. Brake applying pressure begins to build-up during the skid recovery stage. Refer to Figure 8. The pressure build-up in the lines develops brake torque which is available to exert retarding effort on the aircraft when the wheel resumes non-slip speed. The fact that brake applying-force is exerted on the brake during skid recovery presents the possibility of degenerative skids. Degenerative skid refers to a condition in which the wheel r.p.m. falls off during a skid recovery phase.

Figure 8:
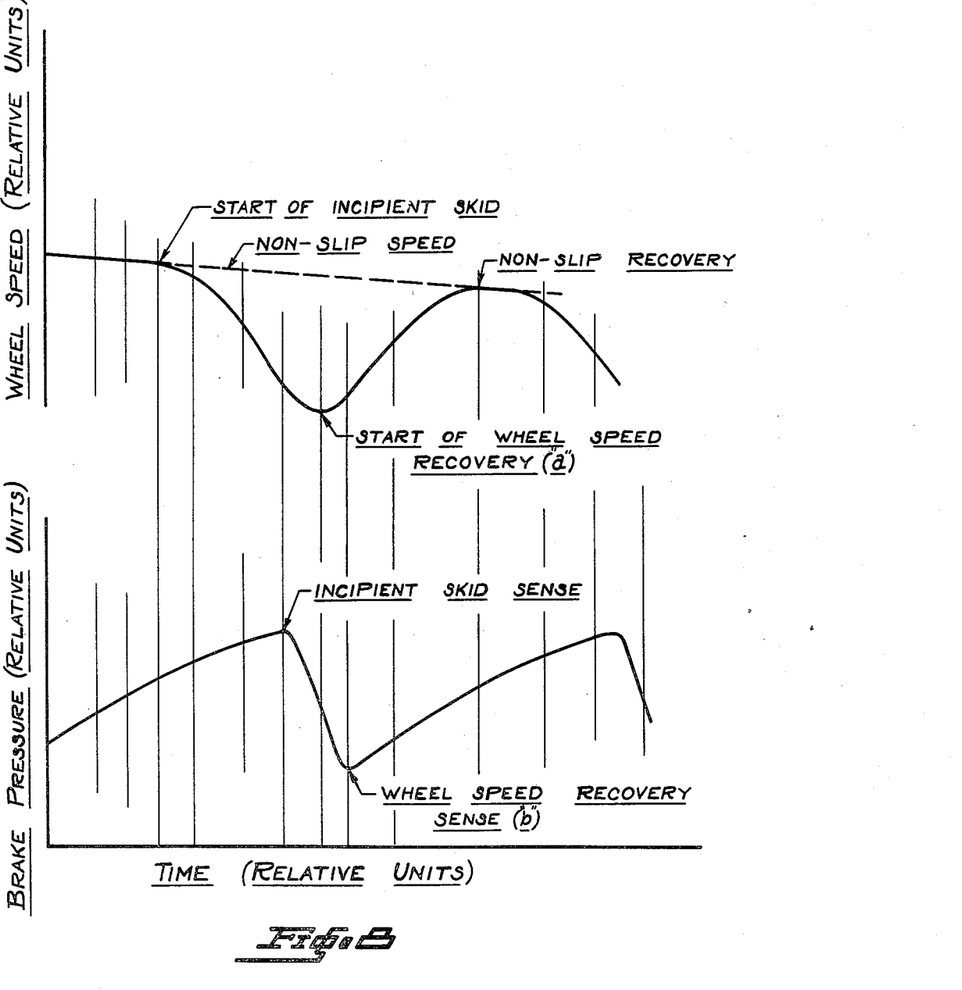
Figure 8 is a composite graph showing curves of wheel r.p.m. and brake line pressure v. time; the same time interval is taken for both wheel r.p.m. and brake line pressure.

Degenerative skids are avoided in two ways:

Suitable relative time locations of inflection points "a" and "b" on the r.p.m. and pressure curves of Figure 8 and also controlling rate of pressure build-up in the applying lines.

The first method enables a slight spin up of the wheel before the start of pressure build-up in the applying lines. I have found that the relative location of these inflection points is quite critical. If pressure is immediately built up at the time wheel r.p.m. reaches its lowest value, degenerative skid is quite likely. For this reason I provide an interval during which the wheel is permitted to spin up slightly, before starting build-up in the brake-applying pressure lines.

This time delay of pressure build-up is secured by means of the two part inertia element. The overrunning rim 62 serves to retard wheel recovery sense by maintaining an angular position of the flywheel which keeps the rotary valve 53 in an open position. The retarding effect of the overrunning rim on the flywheel delays wheel recovery sense and thus provides the necessary time interval for slight wheel spin up. Wheel recovery sense occurs when the force of the overriding rim is insufficient to overcome the torque of the flywheel 60 and springs 63 whereupon shaft 26 moves angularly with respect to the flywheel 60 to close the rotary valve 53.

A second factor to be considered in degenerative skid is rate of pressure build-up in the applying lines during skid recovery. If rate of pressure build-up is excessive then this can produce degenerative skid. The solution in this instance is found in the characteristics of the inlet valve 14. This valve is constructed similar to valve 46 in the anti-skid device but has a lower flow capacity than valve 46. The inlet orifice meters fluid therethrough at a rate represented by curve "C" in Figure 9. This characteristic regulates the rate of pressure build-up in the applying lines in a manner avoiding degenerative skids while the wheel is recovering non-slip speed.

Referring to Figure 11 another aspect of wheel anti-skid operation will be considered in relation to the inlet valve characteristic. When runway conditions are such that the wheel is very susceptible to skid (a low coefficient of friction between the tire and runway) the maximum permissible brake pressures are in the order of $P_1$. Assuming that brake pressure reached after anti-skid operation is $P_2$, it will be seen that braking pressure varies between $P_1$ and $P_2$ during cycling produced by anti-skid operation. In Figure 11 $P_3$ represents the magnitude of brake applying pressure exerted by the pilot. Note that the pressure differential $P_3-P_2$ is very great; this pressure differential would cause a prohibitively large rate of pressure build-up in the brake applying line 20. I have found that the rate of pressure build-up which can produce degenerative skids is much lower in this region of the pressure-displacement curve than for example between pressures $P_4$ and $P_5$. The inlet valve provides metering characteristics such that rate of pressure build-up between $P_1$ and $P_2$ is less than the rate of pressure build-up between $P_4$ and $P_5$. (See curve C in Figure 9). By using an inlet valve of this type it is possible to prevent degenerative wheel skid under adverse runway conditions in which there is a very low coefficient of friction between the tire and the runway.

The performance curves of this invention are to be contrasted with prior art devices in that brake-applying pressure is communicated to the brakes during the recovery cycle. Instead of delaying pressure build-up until the wheel resumes non-slip speed, pressure is applied during recovery stage (without causing a skid) and maximum brake-applying pressure is approximated at non-slip speed of the wheel—the ideal condition of braking.

One of the most important features of the invention is fast response time which is characteristic of the anti-skid device. This fast response time enables brake pressure to be reduced to a point where the wheel can start to recover before the wheel has lost much of its initial speed. Thus, the time interval between the start of a skid and skid recovery can be very greatly shortened and I avoid large wheel speed variations which hinder control of brake pressure v. time. This latter feature enables me to maintain a high average drag load on the aircraft regardless of runway conditions.

The improved response time characteristic of the invention also prevents excessive sliding of the tire and therefore prolongs the wear life of the tire.

The net result of the invention is a reduction in loss of retarding effort on the vehicle due to reduction of braking torque beyond that required to avoid wheel skid. It is no longer necessary to sacrifice stopping distance to prevent skid of the wheels. This result has been accomplished wholly automatically and regardless of runway conditions.

Numerous adaptations of this invention will occur to those who are skilled in the art. Although only one embodiment of the invention has been illustrated and described, various changes in the form and relative arrangement of the parts may be made to suit requirements.

I claim:

1. A hydraulic fluid pressure-regulating system for an aircraft brake in combination with a ground-engaging wheel, said system comprising a pressure-regulating device, a fluid pressure source, a brake actuator, a hydraulic fluid reservoir, a compartment within said device communicating with said fluid pressure source, a conduit interconnecting the compartment and said brake actuator, a valve controlling communication of said compartment with said fluid pressure source, a pressure-responsive element responsive to differential brake and reservoir pressure arranged to control said valve, a chamber within said device, said hydraulic fluid reservoir communicating with said chamber, a rotatable shaft driven by and synchronous with the aircraft wheel, a rotary inertia member rotatably mounted on and driven by said shaft, said inertia member consisting of two relatively movable elements, a friction clutch connected between said elements for resisting relative movement between the elements of said rotary inertia member, a centrally disposed bore in said shaft, a rotary valve constructed in said shaft and inertia member, a passage communicating said rotary valve with said chamber, said rotary valve being operable by angular movement between said shaft and inertia element to establish communication between said bore and said chamber via said passage, means secured to said shaft for positively driving the rotary inertia member but permitting relative angular movement therebetween to establish or interrupt communication of said bore and chamber through said rotary valve, an outlet valve connected between said conduit and said bore for controlling fluid transmittance from the conduit to said bore whereby brake actuating pressure may be relieved through said rotary valve into said chamber, said outlet valve being characterized by regulation of rate of fluid flow therethrough approximately inversely proportional to pressure drop between said conduit and bore, and an inlet valve interconnecting said power source and the brake to by-pass said pressure regulating device, said outlet valve having a greater flow capacity than said inlet valve.

2. For use in a hydraulically actuated aircraft brake, a pressure-regulating device comprising an inlet port, a fluid pressure source communicating with said inlet port, a fluid reservoir, a compartment communicating with said fluid pressure source through said inlet port, an outlet port for said compartment, a conduit interconnecting said pressure-regulating device and the aircraft brakes through said outlet port, a valve controlling communication of said compartment with said fluid pressure source, a fluid pressure responsive element responsive to differential brake and reservoir pressure for controlling said valve, a centrally bored shaft rotatably mounted in said device and driven by the aircraft wheel, a rotary inertia element mounted on and driven by said shaft, said inertia element consisting of two relatively movable members and a friction clutch connected between said members for resisting relative movement therebetween, a driving means secured to said shaft and engageable with angularly spaced stops formed on the rotary inertia element to produce synchronous movement of said rotary inertia element and shaft, a fluid chamber formed in said device, passage means for communicating the bore of said shaft with said chamber, said shaft and inertia element having apertures which are registrable to establish communication between the bore of said shaft and said chamber via said passage means, angular movement of said element on said shaft serving to establish or interrupt registry of said apertures, a second valve connected between said conduit and the bore for regulating fluid flow between the conduit leading to the brakes and the bore of said shaft, said second valve regulating the rate of fluid flow from the brake inversely proportional to pressure drop thereacross, and an inlet valve arranged to bypass said pressure-regulating device in communicating fluid pressure to the brakes at a rate inversely proportional to the pressure drop across said inlet valve, said second valve having a greater flow capacity than said inlet valve.

3. For use in combination with an aircraft wheel and brake, a pressure-regulating device arranged to control communication of actuating force to said brake, and comprising a first chamber, an inlet port for said first chamber, a fluid pressure source communicating with said inlet port, a fluid reservoir, a conduit communicating said first chamber to the aircraft brakes, a fill valve arranged to control passage of fluid from said inlet port to said first chamber, a reciprocable element for controlling said fill valve, said reciprocable element being responsive to fluid pressure developed in said first chamber and said reservoir, resilient means urging said reciprocable element in a direction opening said fill valve to communicate the inlet port with the conduit during an initial brake application, a shaft rotatably mounted in said device and fastened to the aircraft wheel, a second chamber formed in said shaft, a rotary inertia element mounted on and driven by said shaft, said inertia element consisting of two relatively movable components and a friction clutch connected between said components for resisting relative movement therebetween, driving means secured to said shaft and engageable with spaced stops on said rotary inertia element for rotating said inertia element, a third chamber in said device wherein the inertia element is rotatable, passage means for communicating said second and third chamber, said passage means including apertures in said inertia element and shaft which are registrable to establish communication between said second and third chambers when the inertia element moves angularly to override said shaft, resilient means urging angular movement of said inertia element in a direction whereby said driving means engages one of the stops and servers communication of said second and third chambers, a valve element connected between said conduit and said second chamber for controlling fluid flow from the brakes through said conduit to said second chamber, said valve being so constructed as to meter fluid at a rate inversely proportional to pressure drop thereacross, said valve being arranged to relieve pressure in the brake lines upon asynchronous movement of the inertia element and shaft which produces communication of said second and third chambers through said registrable apertures, and an inlet valve arranged to bypass said device and deliver brake applying fluid pressure at a rate less than the bleed rate through said valve element to the third chamber following asynchronous movement of said inertia element and shaft.

4. For use in a hydraulically operated aircraft brake system in combination with a ground engaging aircraft wheel, a fluid pressure source, a fluid reservoir, and a pressure regulating device adapted to deliver brake actuating force according to maximum deceleration rate of the aircraft without skidding of the aircraft wheel, said pressure regulating device including a shaft connected with the aircraft wheel and rotatably mounted in said device, a conduit communicating said device with the brakes, a rotary inertia element mounted on and driven by said shaft and arranged for limited angular movement thereon, said rotary inertia element including two members, one of said members being relatively circularly movable on the other, friction means connected between said members for resisting the relative circular movement therebetween, driving means fastened to said shaft and engageable with a stop on the inertia element to produce synchronous rotation of the shaft and inertia element, a first chamber in said device communicating with said fluid pressure source and containing hydraulic fluid maintained at brake-applying pressure during synchronous movement of said inertia element and shaft, said first chamber being connected with the brake through said conduit, a second hydraulic chamber containing hydraulic fluid maintained at a lower pressure than said first chamber, said second chamber communicating with said fluid reservoir, passage means communicating said first and second chambers, said passage means including a rotary valve operable by relative angular movement of said inertia element on the shaft to bleed fluid pressure from the first chamber to said second chamber, means limiting relative angular movement of said inertia element and shaft during asynchronous rotation of said inertia element and shaft, and a valve regulating fluid ingress to said first chamber from the conduit during the bleed stage, said last mentioned valve metering fluid at a rate inversely proportional to the fluid pressure drop between the conduit and said first chamber to dampen the rate of brake release during asynchronous movement of the inertia element and shaft which is produced by skidding of the wheel, and resilient means for holding said rotary valve in a normally closed position.

5. In combination with an aircraft wheel and brake, a pressure-regulating device to control rate of deceleration of the wheel without skidding thereof, said pressure-regulating device comprising means connecting said device with the aircraft brakes, a fluid pressure source, a fluid reservoir, a member rotatably mounted in said device and connected to the aircraft wheel, a rotary inertia element including two elements, one of said elements being relatively circularly movable on the other, and friction means connected between said members for resisting relative movement of said elements, driving means secured to said member and engageable with the inertia element for synchronizing rotation of the member and inertia element, a first pressure chamber in said device communicating with said fluid pressure source, said first chamber communicating with the aircraft brakes through said connecting means, a second chamber in said device maintained at pressure lower than said first chamber, said second chamber communicating with said fluid reservoir, passage means communicating said first and second chambers, said passage means including a rotary valve operable by angular movement of said inertia element relative to said member and controlling communication between said first and second pressure chambers, resilient means for holding said rotary valve in a normally closed position, and valve means connected between said connecting means and first chamber for controlling fluid passage from said connecting means to said first pressure chamber, said valve means permitting flow therethrough at a rate inversely proportional to the pressure differential in said connecting means and said first pressure chamber.

6. A fluid pressure regulating system for a wheel and brake assembly, said system comprising an anti-skid device for achieving maximum deceleration of the wheel without skidding thereof, a source of fluid pressure, a fluid reservoir, means communicating with said source of fluid pressure for introducing fluid pressure to said anti-skid device and to the brakes, means interconnecting said device with the brakes, pressure responsive means connected between said first and second means for metering predetermined pressure to the brakes through the anti-skid device, said pressure responsive means being responsive to differential brake and reservoir pressure, a member rotatably received in said anti-skid device and secured to the aircraft wheel, a rotary inertia element driven by said member and capable of limited angular movement relative thereto, said rotary inertia element including a circularly movable ring component mounted on the periphery of said element and friction means connected between said ring and element for resisting circular movement of the ring relative to said element; a first pressure chamber in said device communicating with the brake, a second pressure chamber communicating with said hydraulic fluid reservoir, passage means communicating said first and second chambers, said passage means including a normally closed rotary valve controlling communication of said first and second pressure chambers, said rotary valve being opened and closed by relative angular movement between said inertia element and said member, said rotary valve thereby preventing access of the first pressure chamber with the second pressure chamber during synchronous movement of the inertia element and rotatable member, said rotary valve serving to diminish brake applying pressure by communicating the first and second pressure chambers when a skid is sensed by asynchronous movement of the inertia element and said rotatable member.

7. In combination with a vehicle wheel and brake communicating with a source of fluid pressure, an anti-skid device comprising means for communicating with said source of fluid pressure, means for communicating said device with said brake, means for relieving fluid pressure from said brake, an inertia element rotatably and synchronously driven by the vehicle wheel, a normally closed valve connected between said second and third means for relieving fluid pressure from said brake when said valve is opened, said valve being operatively connected to and opened by said inertia element during asynchronous movement between the inertia element and the wheel caused by skidding of the vehicle wheel, means operatively connected to said inertia element for retarding the initiation of pressure build-up in the vehicle brake when the wheel begins skid recovery by controlling movement of said inertia element relative to said wheel to prevent immediate closing of said valve, and means connected between said first and second named means for controlling rate of pressure build-up in the vehicle brake.

References Cited in the file of this patent
UNITED STATES PATENTS

| | | |
|---|---|---|
| 2,291,881 | Coffey | Aug. 4, 1942 |
| 2,431,445 | Anderson | Nov. 25, 1947 |
| 2,447,710 | McCune et al. | Aug. 24, 1948 |
| 2,468,199 | Hines | Apr. 26, 1949 |
| 2,491,666 | Keller | Dec. 20, 1949 |
| 2,526,346 | Goldinger | Oct. 17, 1950 |
| 2,531,054 | Kelley | Nov. 21, 1950 |
| 2,622,615 | Golden et al. | Dec. 23, 1952 |
| 2,684,081 | Chace | July 20, 1954 |
| 2,687,047 | O'Connor | Aug. 24, 1954 |
| 2,698,021 | Bricker et al. | Dec. 28, 1954 |

FOREIGN PATENTS

| | | |
|---|---|---|
| 200,867 | Great Britain | July 16, 1923 |

UNITED STATES PATENT OFFICE
CERTIFICATION OF CORRECTION

June 21, 1960

Patent No. 2,941,845

Lyle E. Osborne

It is hereby certified that error appears in the above numbered patent requiring correction and that the said Letters Patent should read as corrected below.

Column 11, line 27, strike out "hydraulic".

Signed and sealed this 23rd day of May 1961.

(SEAL)
Attest:

ERNEST W. SWIDER
Attesting Officer

DAVID L. LADD
Commissioner of Patents